(12) United States Patent
Fang et al.

(10) Patent No.: US 11,232,315 B2
(45) Date of Patent: Jan. 25, 2022

(54) IMAGE DEPTH DETERMINING METHOD AND LIVING BODY IDENTIFICATION METHOD, CIRCUIT, DEVICE, AND MEDIUM

(71) Applicant: NEXTVPU (SHANGHAI) CO., LTD., Shanghai (CN)

(72) Inventors: Shu Fang, Shanghai (CN); Ji Zhou, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/239,302

(22) Filed: Apr. 23, 2021

(65) Prior Publication Data

US 2021/0334569 A1    Oct. 28, 2021

Related U.S. Application Data

(63) Continuation of application No. PCT/CN2021/085276, filed on Apr. 2, 2021.

(30) Foreign Application Priority Data

Apr. 28, 2020    (CN) .......................... 202010351856.9

(51) Int. Cl.
*G06K 9/00* (2006.01)
*G06T 7/55* (2017.01)
(Continued)

(52) U.S. Cl.
CPC ..... *G06K 9/00906* (2013.01); *G06K 9/00255* (2013.01); *G06K 9/00281* (2013.01);
(Continued)

(58) Field of Classification Search
CPC ........... G06K 9/00906; G06K 9/00255; G06K 9/6267; G06K 9/00281; G06K 9/6217;
(Continued)

(56) References Cited

U.S. PATENT DOCUMENTS 10,659,773 B2  5/2020  Briggs et al.
10,942,529 B2  3/2021  Huang et al.
(Continued)

FOREIGN PATENT DOCUMENTS

CN    1946195 A    4/2007
CN  104680528 A    6/2015
(Continued)

OTHER PUBLICATIONS

"Multi-View Depth Estimation", Multi-View Video Coding, Accessed from internet on Sep. 15, 2021, 20 pages.
(Continued)

*Primary Examiner* — Samir A Ahmed
(74) *Attorney, Agent, or Firm* — Kilpatrick Townsend & Stockton LLP

(57) ABSTRACT

An image depth determining method and a living body identification method, a circuit, a device, and a medium. The image depth determining method includes obtaining pixel coordinates of a feature point pair associated with an object point on a subject, determining a first straight line passing through the origin of a first camera coordinate system of a first camera based on first pixel coordinates and intrinsic parameters of the first camera, determining a second straight line passing through the origin of a second camera coordinate system of a second camera based on second pixel coordinates and intrinsic parameters of the second camera, and determining the depth of the object point based on the first straight line, the second straight line, and extrinsic parameters describing a relative position relationship between the first camera and the second camera.

20 Claims, 7 Drawing Sheets

(51) Int. Cl.
 *G06T 7/80* (2017.01)
 *G06T 7/33* (2017.01)
 *G06K 9/62* (2006.01)
 *G06T 7/73* (2017.01)

(52) U.S. Cl.
 CPC ......... *G06K 9/6217* (2013.01); *G06K 9/6267* (2013.01); *G06T 7/33* (2017.01); *G06T 7/55* (2017.01); *G06T 7/73* (2017.01); *G06T 7/80* (2017.01); *G06T 2207/20084* (2013.01); *G06T 2207/30201* (2013.01)

(58) Field of Classification Search
 CPC .... G06T 7/55; G06T 7/80; G06T 7/73; G06T 7/33; G06T 2207/20084; G06T 2207/30201
 See application file for complete search history.

(56) References Cited

U.S. PATENT DOCUMENTS

| | | | | |
|---|---|---|---|---|
| 2012/0257016 | A1* | 10/2012 | Nakajima | G06T 7/593 348/46 |
| 2015/0287206 | A1* | 10/2015 | Ebisawa | A61B 3/113 382/154 |
| 2015/0294499 | A1* | 10/2015 | Wagner | H04N 13/254 348/46 |
| 2020/0111234 | A1* | 4/2020 | Sun | H04N 5/247 |
| 2020/0342626 | A1* | 10/2020 | Chen | G06T 7/55 |

FOREIGN PATENT DOCUMENTS

| | | |
|---|---|---|
| CN | 110288659 A | 9/2019 |
| CN | 110555878 A | 12/2019 |
| CN | 110751685 A | 2/2020 |
| CN | 110942032 A | 3/2020 |
| CN | 111563924 A | 8/2020 |
| CN | 111780673 A | 10/2020 |
| JP | H07239218 A | 9/1995 |
| JP | 2003294416 A | 10/2003 |
| JP | 2005172703 A | 6/2005 |
| JP | 2010152529 A | 7/2010 |
| JP | 2011123051 A | 6/2011 |
| JP | 2014178265 A | 9/2014 |
| JP | 5821457 B2 | 11/2015 |
| JP | 2018018489 A | 2/2018 |
| JP | 2020042772 A | 3/2020 |
| JP | 6687204 B2 | 4/2020 |
| JP | 6693236 B2 | 4/2020 |
| KR | 20080088513 A | 10/2008 |
| KR | 20200033601 A | 3/2020 |
| KR | 20200041981 A | 4/2020 |

OTHER PUBLICATIONS

Lee, et al., "Triangulation: Why Optimize?", Available Online at: https://arxiv.org/pdf/1907.11917.pdf, Aug. 23, 2019, 14 pages.

* cited by examiner

IMAGE DEPTH DETERMINING METHOD AND LIVING BODY IDENTIFICATION METHOD, CIRCUIT, DEVICE, AND MEDIUM

CROSS-REFERENCES TO RELATED APPLICATIONS

This application claims priority to and is a continuation application under 35 U.S.C. 111(a) of International Patent Application No. PCT/CN2021/085276, filed on Apr. 2, 2021, which claims priority to and benefits of Chinese Patent Application No. 202010351856.9, filed on Apr. 28, 2020. The entire contents of the PCT/CN2021/085276 and 202010351856.9 applications are hereby incorporated by reference in their entirety for all purposes.

TECHNICAL FIELD

The present disclosure relates to the technical field of image processing, and in particular, to an image depth determining method and a living body identification method, a circuit, a device, and a medium.

BACKGROUND OF THE INVENTION

Depth information of a scene is usually obtained in two manners. One is an active ranging solution using a means such as laser ranging, and the other is a stereo vision solution based on a camera. In the stereo vision solution based on a camera, by obtaining a disparity between each pair of matching pixels in two images of different perspectives in the same scene, a disparity map is obtained, and then depth information of the scene is obtained based on the disparity map. In addition, with the rise of artificial neural networks, many depth determining methods based on an artificial neural network have emerged. Both a vision solution and an artificial neural network solution are usually based on the operation of image data of a full image or a large image region.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

BRIEF SUMMARY OF THE INVENTION

According to an aspect of the present disclosure, an image depth determining method is provided. The image depth determining method comprises: obtaining pixel coordinates of a feature point pair associated with an object point on a subject, wherein the feature point pair comprises a first pixel in a first image corresponding to the object point and a second pixel in a second image corresponding to the object point, wherein the first image is an image captured by a first camera for the subject, and the second image is an image captured by a second camera for the subject, and wherein the pixel coordinates comprise first pixel coordinates of the first pixel in the first image and second pixel coordinates of the second pixel in the second image; determining a first straight line passing through the origin of a first camera coordinate system of the first camera based on the first pixel coordinates and intrinsic parameters of the first camera, wherein a first coordinate representation of the object point in the first camera coordinate system is located on the first straight line; determining a second straight line passing through the origin of a second camera coordinate system of the second camera based on the second pixel coordinates and intrinsic parameters of the second camera, wherein a second coordinate representation of the object point in the second camera coordinate system is located on the second straight line; and determining the depth of the object point based on the first straight line, the second straight line, and extrinsic parameters describing a relative position relationship between the first camera and the second camera.

According to another aspect of the present disclosure, a chip circuit is provided, the chip circuit comprising: circuit units configured to perform the steps of the foregoing image depth determining method.

According to another aspect of the present disclosure, an image depth determining apparatus is provided, the apparatus comprising the circuit unit as described above.

According to another aspect of the present disclosure, a computing device is provided, the computing device comprising one or more processors and a memory. The memory stores a program comprising instructions that, when executed by the one or more processors, cause the one or more processors to perform the method as described above.

According to another aspect of the present disclosure, one or more non-transitory computer-readable media are provided, which store a program comprising instructions that, when executed by one or more processors of a computing device, cause the computing device to perform the method as described above.

According to another aspect of the present disclosure, a living body identification method is provided. The living body identification method comprises: determining, for each of a plurality of feature point pairs associated with a plurality of object points on a subject, respective depths of the plurality of object points by performing the image depth determining method as described above, wherein a first pixel of each feature point pair is a facial key-point in the first image, and a second pixel of each feature point pair is a facial key-point in the second image; and identifying whether the subject is a living body, based on the respective depths of the plurality of object points.

More features and advantages of the present disclosure will become apparent from the exemplary embodiments described below with reference to the accompanying drawings.

BRIEF DESCRIPTION OF THE DRAWINGS

The drawings exemplarily show embodiments and form a part of the specification, and are used to explain exemplary implementations of the embodiments together with a written description of the specification. The embodiments shown are merely for illustrative purposes and do not limit the scope of the claims. Throughout the drawings, like reference signs denote like but not necessarily identical elements.

DETAILED DESCRIPTION OF THE INVENTION

In the present disclosure, unless otherwise stated, the terms "first", "second", etc., used to describe various elements are not intended to limit the positional, temporal, or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of the listed items.

In the related art of obtaining the depth of a scene, operations (which may include, for example, epipolar rectification and distortion rectification) usually need to be performed on image data of a full image or a large image region. This leads to relatively high computational complexity, and therefore relatively low processing efficiency or relatively high computing capability requirements.

As will be clearly seen in the following detailed description, an image depth determining method according to an embodiment of the present disclosure can use a feature point pair in an image (rather than data of a full image or an image region) to determine the depth of a scene. Compared with the related art in which operations need to be performed on image data of a full image or a large image region, this can reduce the amount of computing, thereby helping improve processing efficiency or lowering computing capability requirements.

For a better understanding of the embodiments of the present disclosure, a camera imaging model associated with a camera is first described below.

Figure 1:
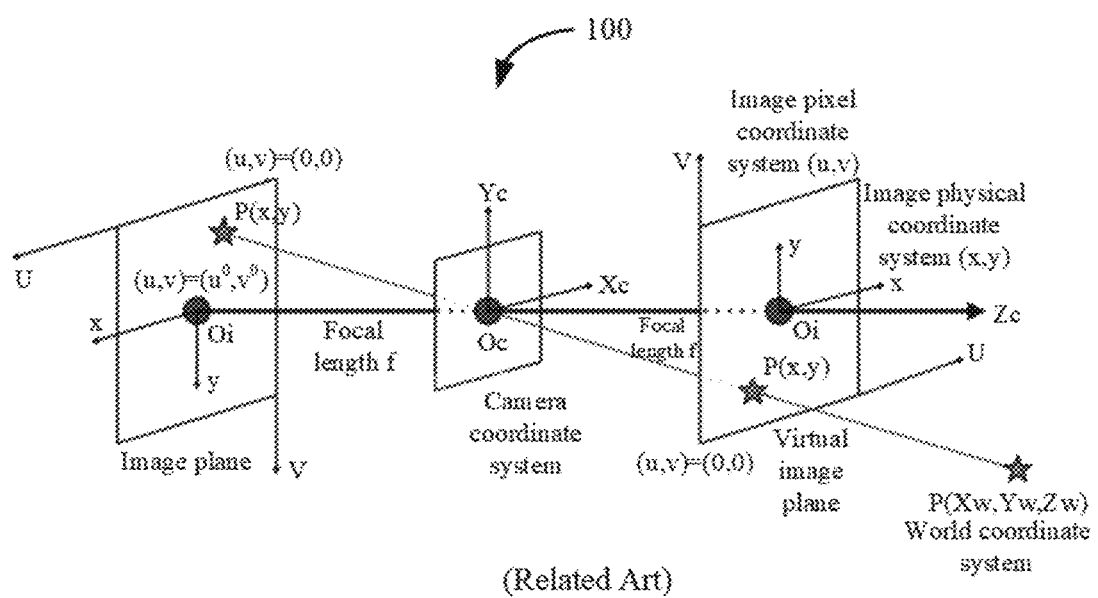
FIG. 1 is a schematic diagram showing a camera imaging model associated with a camera.

FIG. 1 is a schematic diagram showing a camera imaging model 100 associated with a camera. Referring to FIG. 1, an object (shown as a point P (Xw, Yw, Zw) in the figure) in the three-dimensional world is changed to a two-dimensional image (shown as a pixel P (x, y) in the figure) through the camera imaging model 100. The camera imaging model 100 may relate to four coordinate systems: a world coordinate system, a camera coordinate system, an image physical coordinate system, and an image pixel coordinate system.

The world coordinate system is a reference system for representing coordinates of an object in the real world, and is measured in the unit of length (for example, millimeter). The camera coordinate system is a reference system with the origin being an optical center. The camera coordinate system has Xc and Yc axes parallel to x and y directions of an image, respectively, and a Zc axis parallel to an optical axis, where Xc, Yc, and Zc are perpendicular to each other, and are measured in the unit of length. The image physical coordinate system (also referred to as an image coordinate system) is a reference system with the origin being an intersection point of an optical axis and an image plane. The image coordinate system has x and y directions as shown in the figure, and is measured in the unit of length. The image pixel coordinate system (also referred to as a pixel coordinate system) is a reference system with the origin being a vertex of an image. The pixel coordinate system has u and v directions parallel to the x and y directions, and is measured in pixels. Typically, the world coordinate system can be converted to the camera coordinate system based on extrinsic parameters of a camera, and the camera coordinate system can be converted to the image pixel coordinate system based on intrinsic parameters (which usually include a focal length diagonal matrix and a pixel conversion matrix) of the camera.

For a stereo vision system comprising two cameras, the camera imaging model 100 shown in FIG. 1 may represent the imaging principle of either of the two cameras. Hereinafter, one of the two cameras of the stereo vision system is referred to as a first camera C0, and the other is referred to as a second camera C1.

Figure 2:
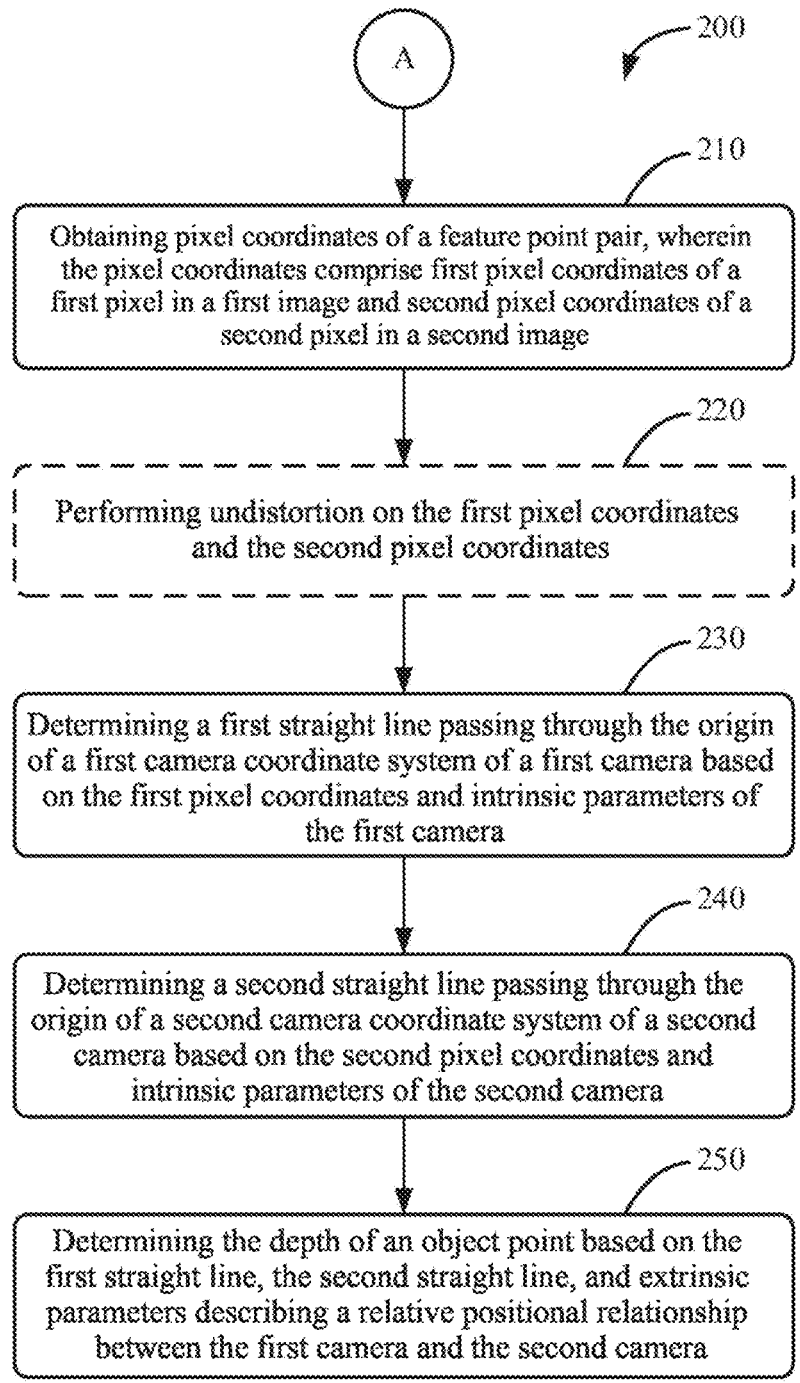
FIG. 2 is a flowchart showing an image depth determining method according to an exemplary embodiment of the present disclosure.

FIG. 2 is a flowchart showing an image depth determining method 200 according to an exemplary embodiment of the present disclosure. Referring to FIG. 2, the image depth determining method 200 comprises: step 210: obtaining pixel coordinates of a feature point pair associated with an object point on a subject, wherein the feature point pair comprises a first pixel in a first image corresponding to the object point and a second pixel in a second image corresponding to the object point, wherein the first image is an image captured by a first camera for the subject, and the second image is an image captured by a second camera for the subject, and wherein the pixel coordinates comprise first pixel coordinates of the first pixel in the first image and second pixel coordinates of the second pixel in the second image; step 230: determining a first straight line passing through the origin of a first camera coordinate system of the first camera based on the first pixel coordinates and intrinsic parameters of the first camera, wherein a first coordinate representation of the object point in the first camera coordinate system is located on the first straight line; step 240: determining a second straight line passing through the origin of a second camera coordinate system of the second camera based on the second pixel coordinates and intrinsic parameters of the second camera, wherein a second coordinate representation of the object point in the second camera coordinate system is located on the second straight line; and step 250: determining the depth of the object point based on the first straight line, the second straight line, and extrinsic parameters describing a relative position relationship between the first camera and the second camera.

The method 200 is described in detail below with reference to FIG. 1 and FIG. 2.

At step 210, first pixel coordinates P0 (x0, y0) and second pixel coordinates P1 (x1, y1) of a feature point pair associated with an object point P on a subject are obtained. The stored or cached first pixel coordinates P0 (x0, y0) and second pixel coordinates P1 (x1, y1) may be read from an appropriate (local and/or remote) storage apparatus. Alternatively, the first pixel coordinates P0 (x0, y0) and the second pixel coordinates P1 (x1, y1) may be received from an external device over a wired or wireless communication link. The scope of the subject matter claimed by the present disclosure is not limited in this respect.

Figure 3:
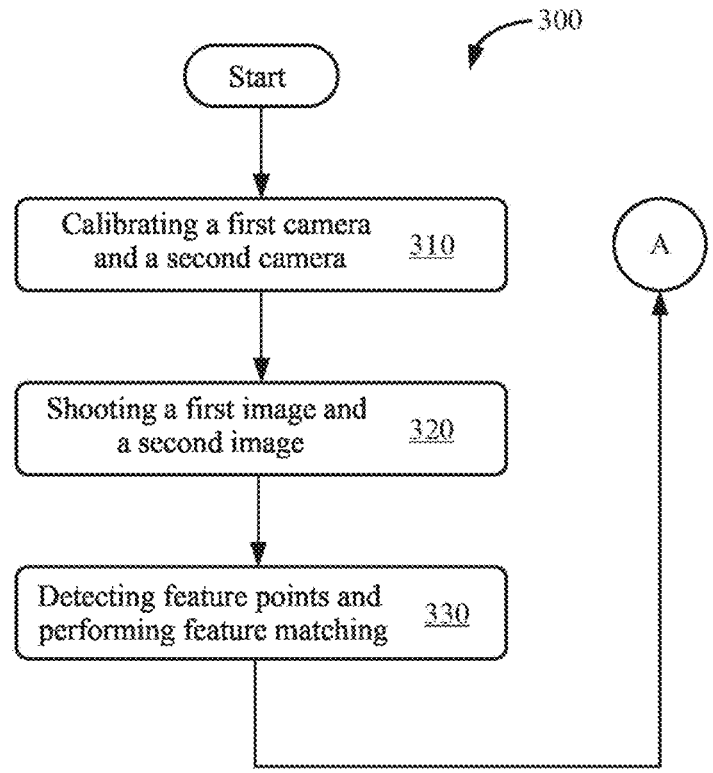
FIG. 3 is a flowchart showing a data preparation process for the image depth determining method of FIG. 2 according to an exemplary embodiment of the present disclosure.

In some embodiments, before step 210, the first pixel coordinates P0 (x0, y0) and the second pixel coordinates P1 (x1, y1) may be obtained by performing a data preparation process 300 described with respect to FIG. 3. FIG. 3 is a flowchart showing a data preparation process 300 for image depth determining according to an exemplary embodiment of the present disclosure. Referring to FIG. 3, the process 300 may comprise several steps.

At step 310, calibration of the first camera C0 and the second camera C1 is performed. Intrinsic parameters and extrinsic parameters of each of the first camera C0 and the second camera C1 may be calibrated using, for example, the Zhang's calibration method, but other calibration methods are also possible. Single-lens parameters of the first camera C0 are denoted as {K0, R0, T0}, where K0 is an intrinsic parameter of the first camera C0, and R0 and T0 are extrinsic parameters of the first camera C0. More specifically, R0 and T0 are a rotation matrix and a translation vector from a world coordinate system to a camera coordinate system of the first camera C0, respectively, and K0 is a conversion matrix from the camera coordinate system of the first camera C0 to a pixel coordinate system of the first camera C0. Single-lens parameters of the second camera C1 are denoted as {K1, R1, T1}, where K1 is an intrinsic parameter of the second camera C1, and R1 and T1 are extrinsic parameters of the second camera C1. More specifically, R1 and T1 are a rotation matrix and a translation vector from a world coordinate system to a camera coordinate system of the second camera C1, respectively, and K1 is a conversion matrix from the camera coordinate system of the second camera C1 to a pixel coordinate system of the second camera C1.

In an example, $$K0 = \begin{bmatrix} fx^0 & 0 & u^0 \\ 0 & fy^0 & v^0 \\ 0 & 0 & 1 \end{bmatrix},$$

where $fx^0 = f0/dx0$, and $fy^0 = f0/dy0$, f0 being a focal length of the first camera C0, dx0 being a dimension of a single pixel of the first camera C0 in the x direction, dy0 being a dimension of the single pixel of the first camera C0 in the y direction, and $u^0$ and $v^0$ denoting offsets (measured in pixels) of the origin of the image coordinate system of the first camera C0 relative to the origin of the pixel coordinate system of the first camera C0 in the x direction and the y direction, respectively.

Similarly, in this example, $$K1 = \begin{bmatrix} fx^1 & 0 & u^1 \\ 0 & fy^1 & v^1 \\ 0 & 0 & 1 \end{bmatrix},$$

where $fx^1 = f1/dx1$, and $fy^1 = f1/dy1$, f1 being a focal length of the second camera C1, dx1 being a dimension of a single pixel of the second camera C1 in the x direction, dy1 being a dimension of the single pixel of the second camera C1 in the y direction, and $u^1$ and $v^1$ denoting offsets (measured in pixels) of the origin of the image coordinate system of the second camera C1 relative to the origin of the pixel coordinate system of the second camera C1 in the x direction and the y direction, respectively.

It will be appreciated that the first camera C0 and the second camera C1 may be appropriately arranged to form a stereo vision system. In some embodiments, the first camera C0 and the second camera C1 may be arranged horizontally or arranged vertically to form a binocular camera, but this is not the only arrangement. In some embodiments, the first camera C0 and the second camera C1 may be arranged farther away from each other than the configuration of a typical binocular camera.

After the first camera C0 and the second camera C1 have been arranged, extrinsic parameters describing a relative position relationship between the first camera C0 and the second camera C1 may be further calibrated and denoted as (R, T). By using the single-lens parameters {K0, R0, T0} of the first camera C0 and the single-lens parameters {K1, R1, T1} of the second camera C1, a coordinate Xw in the world coordinate system can be expressed as: Xc0=R0Xw+T0 in the camera coordinate system of the first camera C0, and it can be expressed as: Xc1=R1Xw+T1 in the camera coordinate system of the second camera C1. Eliminate Xw, to obtain: Xc0=R0R1$^{-1}$Xc1+T0−R0R1$^{-1}$T1. Define R=R0R1$^{-1}$ and T=T0−R0R1$^{-1}$T1, to obtain a rotation matrix R and a translation vector T between the first camera C0 and the second camera C1. Since the extrinsic parameters (R, T) describe the relative position relationship between the first camera C0 and the second camera C1, the extrinsic parameters (R, T) can be used to convert coordinates in the camera coordinate system of the second camera C1 to coordinates in the camera coordinate system of the first camera C0.

Given the intrinsic and extrinsic parameters of the first camera C0 and the second camera C1, the depth can be determined according to two straight lines in the camera coordinate systems of the two cameras. This may impose no restriction on models of the first camera C0 and the second camera C1. In other words, in various embodiments, the first camera C0 and the second camera C1 may be cameras of different models. This expands the source of available cameras, thereby providing potential system compatibility and reduced costs.

At step 320, the first camera C0 and the second camera C1 are used to capture the same scene. Images obtained by the first camera C0 and the second camera C1 are denoted as a first image IMG0 and a second image IMG1, respectively. In some embodiments, the first camera C0 and the second camera C1 capture the scene at the same time to obtain IMG0 and IMG1. In some embodiments, the first camera C0 and the second camera C1 may obtain IMG0 and IMG1 by capturing the scene basically at the same time. In this context, the phrase "basically at the same time" may mean that two time points have a difference of, for example, 1 second, 0.5 seconds, 0.1 seconds, or more or less. This may be feasible in some application scenarios, such as in a scene where a subject is still or is required to remain still.

The obtained first image IMG0 and second image IMG1 will have pixels corresponding to the subject in the scene (for example, the point P, shown in FIG. 1, which is referred to as an object point hereinafter). It will be appreciated that an object in the real world can be considered to be formed by countless object points, and it is not intended to limit the actual size of the object point herein. In this context, for the purpose of description, representations of the object point P in the first image IMG0 and the second image IMG1 correspond to the respective pixels in the two images.

At step 330, feature points are detected from the first image IMG0 and the second image IMG1, and feature matching is performed to obtain at least one feature point pair. Each feature point pair comprises a first pixel in the first image IMG0 that represents one image feature (for example, a corner point, an edge point, a spot, etc.) and a second pixel in the second image IMG1 that represents the same image feature. It can be learned from the camera imaging model 100 shown in FIG. 1 that, the first pixel is a representation, in the first image IMG0, of an object point (for example, the object point P) in the real world, and the second pixel is a representation of the same object point in the second image IMG1.

The detection of the feature points in the first image IMG0 and the second image IMG1 can be completed by using any known or future feature point detection algorithm. Typical feature point detection algorithms may include, for example, scale invariant feature transform (SIFT), speeded up robust features (SURF), features from accelerated segment test (FAST), binary robust independent elementary features (BRIEF), and oriented FAST and rotated BRIEF(ORB). After the feature points in the first image IMG0 and the second image IMG1 are obtained, any known or future feature matching algorithm can be used to perform matching of the feature points, to obtain a feature point pair. Typical feature matching algorithms may include methods such as brute-force matcher and FLANN-based matcher. In order to improve the matching accuracy, other criteria or algorithms, such as the "Hamming distance being less than twice the minimum distance" criterion, cross matching, K-nearest neighbor (KNN) matching, and random sample consensus (RANSAC), can also be used in combination to filter out incorrectly matched feature point pairs. To avoid obscuring the subject matter claimed in the present disclosure, these algorithms are not described in detail here.

By virtue of the process 300, the first pixel, in the first image IMG0, of the object point P in the world coordinate system and its first pixel coordinates P0 (x0, y0), and the second pixel in the second image IMG1 and its second pixel coordinates P1 (x1, y1) can be obtained. The obtained pixel coordinates P0 (x0, y0) and P1 (x1, y1) may be stored or cached in an appropriate (for example, local and/or remote) storage apparatus for subsequent use.

Then, the process 300 proceeds to a node A, as shown in FIG. 3. It will be appreciated that the node A is not intended to indicate any actual step or action, but is provided as an "interface" between the process 300 and possible subsequent processing steps.

It will also be appreciated that although the process 300 is shown in FIGS. 2 and 3 as being performed before step 210 of FIG. 2, in an alternative embodiment, all or some of the steps of the process 300 may be completed in step 210. For example, step 210 may comprise the operation of step 330. In some embodiments, step 210 may comprise the operations of steps 320 and 330. In some embodiments, step 210 may further comprise the operation of step 310.

Now referring back to FIG. 2, the method 200 may optionally comprise step 220 in which undistortion is performed on the first pixel coordinates P0 (x0, y0) and the second pixel coordinates P1 (x1, y1). Image distortion typically arises from deviations in lens manufacturing precision and assembly process, which causes an original image to be distorted. A distortion coefficient of each lens can be obtained through calibration. As is known, a typical distortion rectification process is as follows: (1) converting a pixel coordinate system of a source image into a camera coordinate system by using an intrinsic matrix; (2) rectifying camera coordinates of the image by using a distortion coefficient; and (3) after rectification, the camera coordinate system is converted into a pixel coordinate system by using the intrinsic matrix, and assigning values (for example, by interpolation) to new image coordinates according to pixel values of source image coordinates.

A conventional depth determining solution requires that distortion rectification is performed on a full image or an image region. In contrast, the method 200 determines the depth based on the feature point pair, which means that undistortion may be performed only on the pixel coordinates P0 (x0, y0) and P1 (x1, y1). This helps reduce the amount of computing, thereby improving the efficiency of depth determining. For ease of understanding, undistorted P0 and P1 are still denoted as P0 (x0, y0) and P1 (x1, y1) below.

It will be appreciated that step 220 is optional, because in some embodiments, the method 200 can proceed directly from step 210 to step 230 without distortion rectification. It will also be appreciated that step 220 is not necessarily performed between steps 210 and 230. For example, step 220 may be performed before step 330 of FIG. 3. In addition, in various embodiments, epipolar rectification (also referred to as parallel rectification) may not be performed on the first image IMG0 captured by the first camera C0 and the second image IMG1 captured by the second camera C1. This is because after the feature point pair is obtained through image matching, no processing of pixel values is required in the method 200, and therefore two images that have been strictly rectified are not required. This helps reduce computational complexity and improve processing efficiency.

At step 230, a first straight line L0 passing through the origin of the camera coordinate system of the first camera C0 (hereinafter referred to as a first camera coordinate system) is determined based on the first pixel coordinates P0 (x0, y0) and the intrinsic parameter K0 of the first camera C0. According to the camera imaging model 100 shown in FIG. 1, a representation of the object point P in the first camera coordinate system (which is an unknown quantity, hereinafter also referred to as a first coordinate representation) is located on the first straight line L0. Using the intrinsic parameter K0 of the first camera C0, a relationship between the first coordinate representation PC0 (PC0x, PC0y, PC0z) and the first pixel coordinates P0 (x0, y0) can be expressed as follows:

$$\begin{bmatrix} x0 \\ y0 \\ 1 \end{bmatrix} = \frac{1}{PC0z} K0 \begin{bmatrix} PC0x \\ PC0y \\ PC0z \end{bmatrix} \qquad \text{(eq 1)}$$

The origin of the first camera coordinate system and the first coordinate representation PC0 can define the first straight line L0, a direction vector of which is $$\vec{L0} = (L0x, L0y, L0z) = K0^{-1}\begin{bmatrix} x0 \\ y0 \\ 1 \end{bmatrix}.$$

In other words, the object point corresponding to the first pixel P0 in the first image is located on the first straight line L0. In addition, according to equation (eq1), the coordinate components PC0x and PC0y of the first coordinate representation PC0 (PC0x, PC0y, PC0z) can both be represented by using the coordinate component PC0z.

At step 240, a second straight line L1 passing through the origin of the camera coordinate system of the second camera C1 (hereinafter referred to as a second camera coordinate system) is determined based on the second pixel coordinates P1 (x1, y1) and the intrinsic parameter K1 of the second camera C1. According to the camera imaging model 100 shown in FIG. 1, a representation of the object point P in the second camera coordinate system (which is an unknown quantity, hereinafter also referred to as a second coordinate representation) is located on the second straight line L1. Using the intrinsic parameter K1 of the second camera C1, a relationship between the second coordinate representation PC1 (PC1x, PC1y, PC1z) and the second pixel coordinates P1 (x1, y1) can be expressed as follows:

$$\begin{bmatrix} x1 \\ y1 \\ 1 \end{bmatrix} = \frac{1}{PC1z}K1\begin{bmatrix} PC1x \\ PC1y \\ PC1z \end{bmatrix} \quad (eq2)$$

The origin of the second camera coordinate system and the second coordinate representation PC1 (PC1x, PC1y, PC1z) can define the second straight line L1. As will be described below, a representation of the second straight line L1 in the second camera coordinate system can be converted to that in the first camera coordinate system, so that a relative position relationship between the first straight line L0 (which is represented in the first camera coordinate system) and the second straight line L1 can be used for depth determining. It will be appreciated that the representation of the second straight line L1 in the second camera coordinate system and a representation of the straight line in the first camera coordinate system represent the same straight line, except that different coordinate systems are used as reference.

At step 250, the depth of the object point P is determined based on the first straight line L0, the second straight line L1, and extrinsic parameters (R, T) describing a relative position relationship between the first camera C0 and the second camera C1. In some embodiments, step 250 may comprise exemplary operations shown in FIG. 4: step 410, determining a representation of the second straight line in the first camera coordinate system based on the second straight line and the extrinsic parameters; and step 420, determining, in the first camera coordinate system, the depth of the object point based on the first straight line and the second straight line.

Figure 4:
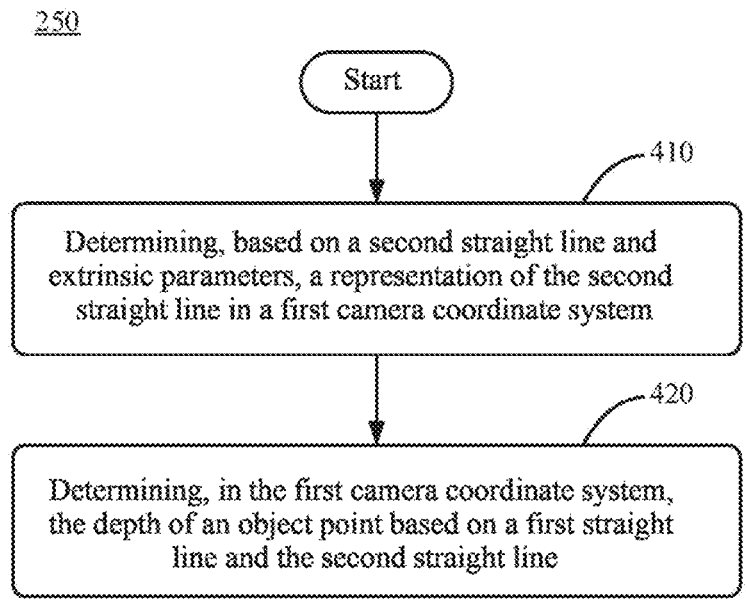
FIG. 4 is a flowchart showing exemplary operations of a step of determining the depth of an object point in the method of FIG. 2 according to an exemplary embodiment of the present disclosure.

Referring to FIG. 4, at step 410, the representation of the second straight line L1 in the first camera coordinate system is determined based on the second straight line L1 and the extrinsic parameters (R, T). In a stereo vision system, for ease of computing, the camera coordinate system of one (for example, the left camera) of the two cameras is usually selected as a primary coordinate system, and the primary coordinate system coincides with the world coordinate system. Herein, the camera coordinate system of the first camera C0 (i.e., the first camera coordinate system) is taken as the world coordinate system, and depth determining is performed in the first camera coordinate system. However, as noted in the paragraph at the beginning of the detailed description, the terms "first" and "second" are not intended to limit a positional relationship or importance relationship of the two cameras. As described above, in the second camera coordinate system, the origin of the second camera coordinate system and the second coordinate representation PC1 (PC1x, PC1y, PC1z) define the second straight line L1. Therefore, to determine the representation of the second straight line L1 in the first camera coordinate system, the origin of the second camera coordinate system and the second coordinate representation PC1 (PC1x, PC1y, PC1z) may be both converted to those in the first camera coordinate system. Specifically, the second coordinate representation PC1 (PC1x, PC1y, PC1z) is converted to a representation PC10 (PC10x, PC10y, PC10z) in the first camera coordinate system (hereinafter referred to as a third coordinate representation) by using the extrinsic parameters (R, T). The conversion process is as follows:

$$\begin{bmatrix} PC10x \\ PC10y \\ PC10z \end{bmatrix} = R\begin{bmatrix} PC1x \\ PC1y \\ PC1z \end{bmatrix} + T \quad (eq3)$$

Similarly, a representation, in the first camera coordinate system, of the origin of the second camera coordinate system (hereinafter referred to as a fourth coordinate representation) is determined as $$C10 = R*\begin{bmatrix} 0 \\ 0 \\ 0 \end{bmatrix} + T = T,$$

denoted as C10 (Tx, Ty, Tz).

Then, the representation of the second straight line L1 in the first camera coordinate system is determined based on the third coordinate representation PC10 (PC10x, PC10y, PC10z) and the fourth coordinate representation C10 (Tx, Ty, Tz). Specifically, the second straight line L1 is now defined by the third coordinate representation PC10 and the fourth coordinate representation C10, and a direction vector of the second straight line L1 is $$\vec{L1} = (L1x, L1y, L1z) = RK1^{-1}\begin{bmatrix} x1 \\ y1 \\ 1 \end{bmatrix}.$$

At step 420, the depth of the object point P is determined in the first camera coordinate system based on the first straight line L0 and the second straight line L1. In some embodiments, step 420 may comprise exemplary operations shown in FIG. 5: determining a common perpendicular of the first straight line and the second straight line in response to the first straight line and the second straight line being non-coplanar; determining coordinates of a first intersection point of the first straight line and the common perpendicular and coordinates of a second intersection point of the second straight line and the common perpendicular; and determining the depth of the object point based on a first depth component of the coordinates of the first intersection point and a second depth component of the coordinates of the second intersection point.

Figure 5:
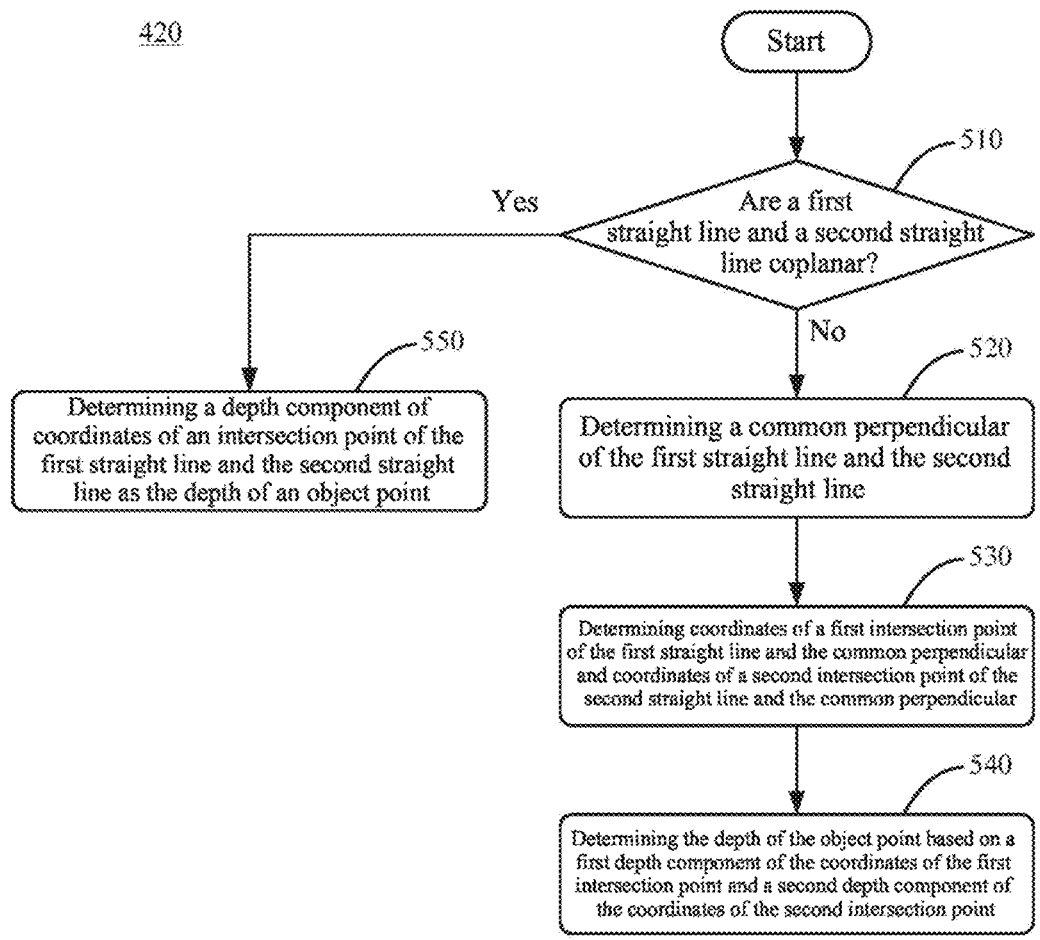
FIG. 5 is a flowchart showing exemplary operations of a step of determining the depth of the object point based on a first straight line and a second straight line in the operations of FIG. 4 according to an exemplary embodiment of the present disclosure.

Referring to FIG. 5, at step 510, it is determined whether the first straight line L0 and the second straight line L1 are coplanar. In some embodiments, this can be implemented by using a vector method. As is known, the vector method is a useful tool to solve the problems of coplanarity and collinearity in plane geometry and solid geometry. Thus, a matrix $$A = \begin{bmatrix} A1^T \\ A2^T \\ A3^T \end{bmatrix}$$

is constructed, where $$A1 = \begin{bmatrix} A1_1 \\ A1_2 \\ A1_3 \end{bmatrix} = K0^{-1} \begin{bmatrix} x0 \\ y0 \\ 1 \end{bmatrix},$$

namely, the direction vector of the first straight line L0;

$$A2 = \begin{bmatrix} A2_1 \\ A2_2 \\ A2_3 \end{bmatrix} = \begin{bmatrix} Tx \\ Ty \\ Tz \end{bmatrix},$$

namely, the translation vector T in the extrinsic parameters (R, T); and $$A3 = \begin{bmatrix} A3_1 \\ A3_2 \\ A3_3 \end{bmatrix} = RK1^{-1} \begin{bmatrix} x1 \\ y1 \\ 1 \end{bmatrix},$$

namely, the direction vector of the second straight line L1. Then, it is determined whether a determinant |A| of the matrix A is zero. If |A|=0, it indicates that the first straight line L0 and the second straight line L1 are coplanar; otherwise, it indicates that the first straight line L0 and the second straight line L1 are non-coplanar. For reasons such as the installation precision of the camera, the first straight line L0 and the second straight line L1 are usually non-coplanar. However, alternatively, in some ideal situations, the first straight line L0 and the second straight line L1 may be coplanar.

Figure 6:
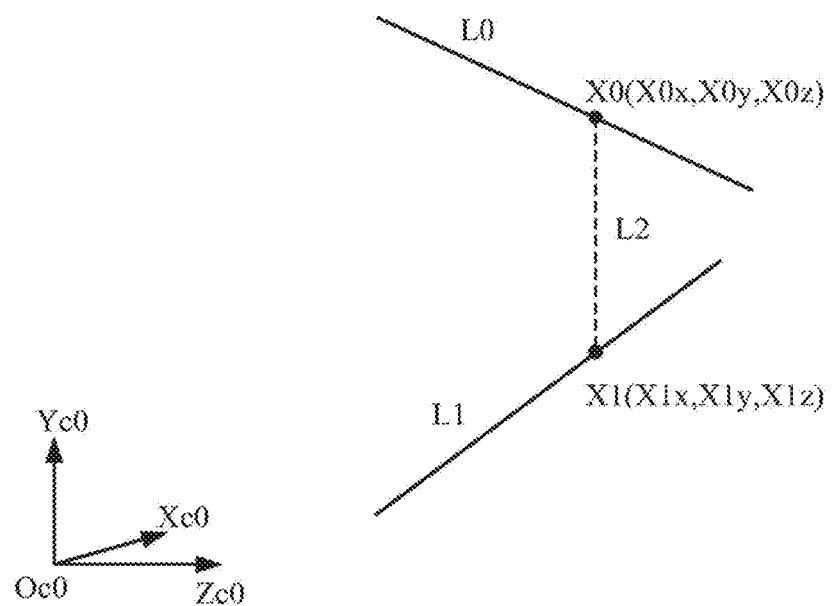
FIG. 6 is a schematic diagram showing that the first straight line and the second straight line are non-coplanar in a first camera coordinate system.

When it is determined (in step 510) that the first straight line L0 and the second straight line L1 are non-coplanar, the process proceeds to step 520, in which a common perpendicular of the first straight line L0 and the second straight line L1 is determined and denoted as L2. FIG. 6 is a schematic diagram showing the first straight line L0 and the second straight line L1 that are non-coplanar in the first camera coordinate system. By using a vector cross product, a unit direction vector of the common perpendicular L2 may be calculated as follows:

$$\overrightarrow{L2} = (L2x, L2y, L2z) = \frac{\overrightarrow{L0} \times \overrightarrow{L1}}{|\overrightarrow{L0} \times \overrightarrow{L1}|} \quad (eq4)$$

At step 530, coordinates of an intersection point (hereinafter referred to as a first intersection point) of the first straight line L0 and the common perpendicular L2 and coordinates of an intersection point (hereinafter referred to as a second intersection point) of the second straight line L1 and the common perpendicular L2 are determined. The first intersection point is denoted as X0, and its coordinates are X0 (X0x, X0y, X0z). The second intersection point is X1, and its coordinates are X1 (X1x, X1y, X1z). Then, there is the following system of equations $$\begin{cases} \dfrac{X0x}{L0x} = \dfrac{X0y}{L0y} = \dfrac{X0z}{L0z} \\ \dfrac{X1x - Tx}{L1x} = \dfrac{X1y - Ty}{L1y} = \dfrac{X1z - Tz}{L1z} \\ \dfrac{X0x - X1x}{L2x} = \dfrac{X0y - X1y}{L2y} = \dfrac{X0z - X1z}{L2z} \end{cases} \quad (eq5)$$

The system of equations (eq5) is established according to the following spatial relationships:

(1) the first equation represents that the direction vector $\overrightarrow{L0}$ of the first straight line L0 is parallel to a direction vector pointing from the first intersection point X0 to the origin of the first camera coordinate system;

(2) the second equation represents that the direction vector $\overrightarrow{L1}$ of the second straight line L1 is parallel to a direction vector pointing from the second intersection point X1 to the origin of the second camera coordinate system (more specifically, the fourth coordinate representation C10 (Tx, Ty, Tz), in the first camera coordinate system, of the origin of the second camera coordinate system); and (3) the third equation represents that a direction vector $\overrightarrow{L2}$ of the common perpendicular L2 is parallel to a direction vector pointing from the second intersection point X1 to the first intersection point X0.

At step 540, the depth of the object point P is determined based on a depth component X0z (hereinafter referred to as a first depth component) of the coordinates of the first intersection point X0 and a depth component X1z (hereinafter referred to as a second depth component) of the coordinates of the second intersection point X1. Since the first camera coordinate system coincides with the world coordinate system, the depth component PC0z of the first coordinate representation PC0 (PC0x, PC0y, PC0z) of the object point P in the first camera coordinate system may be considered as the depth of the object point P. Thus, on the basis that the coordinates X0 (X0x, X0y, X0z) of the first intersection point and the coordinates X1 (X1x, X1y, X1z) of the second intersection point have been determined in step 530, a predefined function value of the first depth component X0z and the second depth component X1z may be calculated and used as the depth of the object point P.

In some embodiments, the predefined function value comprises a weighted average of the first depth component X0z and the second depth component X1z. In some embodiments, the weighted average comprises an arithmetic average. In this case, the depth PC0z of the object point P is defined as follows:

$$PC0z = (X0z + X1z)/2 \quad (eq6)$$

According to the system of equations (eq5), the center of the first intersection point X0 and the second intersection point X1 can be obtained:

$$\frac{X0 + X1}{2} = T - \frac{T^T * (\vec{L0} \times \vec{L2}) * \vec{L1}}{\vec{L1}^T * (\vec{L0} \times \vec{L2})} - \frac{T^T * \vec{L2} \times \vec{L2}}{2},$$

and a depth component of the center is PC0z. Until now, the depth of the object point P has been determined from the pixel coordinates P0 (x0, y0) and P1 (x1, y1) of the pair of feature points.

In the above embodiment, equation (eq6) represents that the depth PC0z is defined as a depth component at the midpoint between the first intersection point X0 and the second intersection point X1 on the common perpendicular L2. However, it will be appreciated that the depth PC0z may also be defined as a depth component at another point on the common perpendicular L2. In other embodiments, the depth PC0z may be defined as any other appropriate function value.

Referring back to FIG. 5, when it is determined (in step 510) that the first straight line L0 and the second straight line L1 are coplanar, the process proceeds to step 550. In this case, a depth component X2z of coordinates X2 (X2x, X2y, X2z) of an intersection point X2 of the first straight line L0 and the second straight line L1 may be determined as the depth of the object point P. Certainly, other embodiments are also possible.

Figure 7:
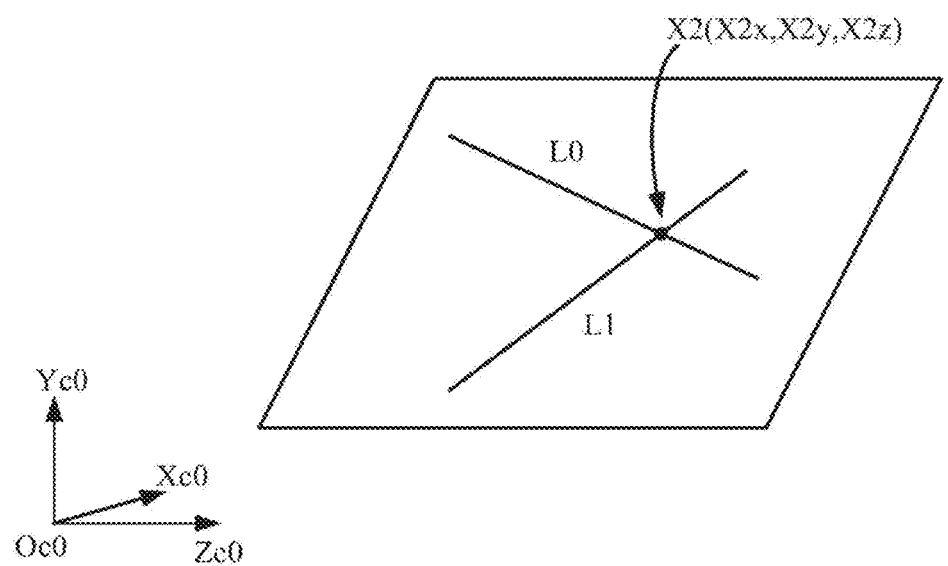
FIG. 7 is a schematic diagram showing that the first straight line and the second straight line are coplanar in the first camera coordinate system.

FIG. 7 is a schematic diagram showing the first straight line L0 and the second straight line L1 that are coplanar in the first camera coordinate system. As described above, the direction vector $\vec{L0}$ of the first straight line L0 and the direction vector $\vec{L1}$ of the second straight line L1 are already known, where $$\vec{L0} = (L0x, L0y, L0z) = K0^{-1} \begin{bmatrix} x0 \\ y0 \\ 1 \end{bmatrix},$$

and $$\vec{L1} = (L1x, L1y, L1z) = RK1^{-1} \begin{bmatrix} x1 \\ y1 \\ 1 \end{bmatrix}.$$

Therefore, the coordinates X2 (X2x, X2y, X2z) of the intersection point of the two straight lines can be obtained by solving simultaneous expressions for straight lines in space of the first straight line L0 and the second straight line L1. This solving process is a simple problem of solid geometry, and details are not described here. After the coordinates X2 (X2x, X2y, X2z) of the intersection point are obtained, the depth component X2z of the coordinates X2 (X2x, X2y, X2z) of the intersection point may be used as the depth of the object point P.

Although the various operations are depicted in the drawings in a particular order, this should not be understood as requiring these operations to be performed in the particular order shown or in a sequential order, nor should this be understood as requiring all the operations shown to be performed to obtain the desired result. For example, step 240 may be performed before step 230 or concurrently with step 230. For another example, step 220 may even be omitted.

Figure 8:
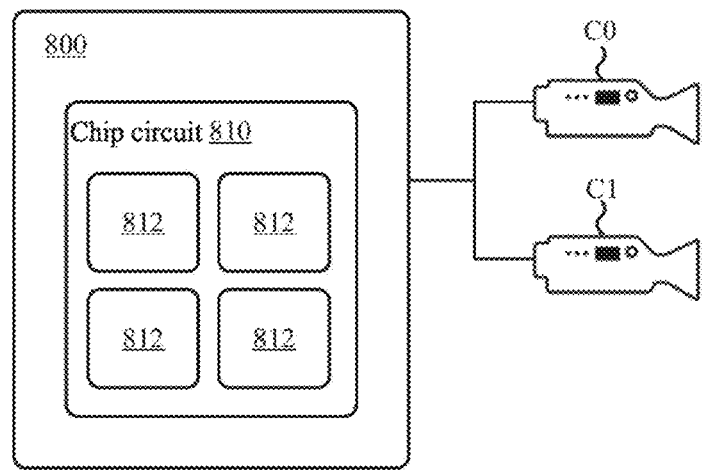
FIG. 8 is a structural block diagram showing an image depth determining apparatus according to an exemplary embodiment of the present disclosure.

FIG. 8 is a structural block diagram showing an image depth determining apparatus 800 according to an exemplary embodiment of the present disclosure. Referring to FIG. 8, the image depth determining apparatus 800 determines the depth of a scene based on data of images captured by the first camera C0 and the second camera C1. The image depth determining apparatus 800 comprises a chip circuit 810, and the chip circuit comprises a circuit unit 812 configured to perform the steps of the foregoing image depth determining method 200 and variations thereof.

As used herein, the term "circuit" may be part of or comprise the following circuits: an application-specific integrated circuit (ASIC), an electronic circuit, a processor (shared, dedicated, or group) and/or a memory (shared, dedicated, or group) that execute one or more software or firmware programs, a combinational logic circuit that provides the functions, and/or other suitable hardware components. In some embodiments, a circuit or functions associated with the circuit may be implemented by one or more software or firmware modules. In some embodiments, a circuit may comprise logic that is at least partially operable in hardware. The embodiments described herein may be implemented as a system using any properly configured hardware and/or software.

Although the image depth determining apparatus 800 is shown in FIG. 8 as being separated from a first camera C0 and a second camera C1, in some embodiments, the image depth determining apparatus 800 may comprise the first camera C0 and the second camera C1.

Figure 9:
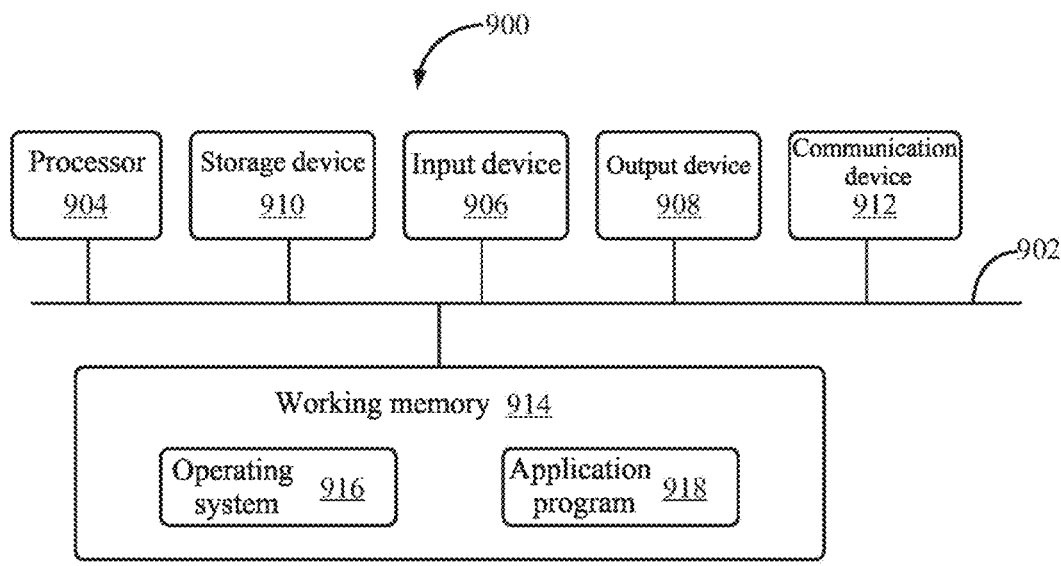
FIG. 9 is a structural block diagram showing a computing device according to an exemplary embodiment of the present disclosure.

FIG. 9 is a structural block diagram showing a computing device 900 according to an exemplary embodiment of the present disclosure. The computing device 900 may comprise one or more processors and a memory. The memory stores a program comprising instructions that, when executed by the one or more processors, cause the one or more processors to perform the foregoing image depth determining method 200 and variations thereof.

Referring to FIG. 9, the computing device 900 is now described, which is an example of a hardware device that can be applied to various aspects of the present disclosure. The computing device 900 may be any machine configured to perform processing and/or computing, which may be, but is not limited to, a workstation, a server, a desktop computer, a laptop computer, a tablet computer, a personal digital assistant, a smartphone, an onboard computer, an access control system, an attendance device, or any combination thereof. The foregoing image depth determining apparatus 800 may be implemented, in whole or at least in part, by the computing device 900 or a similar device or system. Although the computing device 900 represents an example of several types of computing platforms, the computing device 900 may comprise more or fewer elements and/or a different element arrangement than those shown in FIG. 9, and does not limit the scope of the claimed subject matter in these aspects.

In some embodiments, the computing device 900 may comprise elements in connection with a bus 902 or in communication with a bus 902 (possibly via one or more interfaces). For example, the computing device 900 may comprise the bus 902, one or more processors 904, one or more input devices 906, and one or more output devices 908. The one or more processors 904 may be any type of processors and may include, but are not limited to, one or more general-purpose processors and/or one or more dedicated processors (e.g., special processing chips). The input device 906 may be any type of device capable of inputting information to the computing device 900, and may include, but is not limited to, a mouse, a keyboard, a touchscreen, a microphone, and/or a remote controller. The output device 908 may be any type of device capable of presenting information, and may include, but is not limited to, a display, a speaker, a video/audio output terminal, a vibrator, and/or a printer. The computing device 900 may also comprise a non-transitory storage device 910 or be connected to a non-transitory storage device 910. The non-transitory storage device may be any non-transitory storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions, and/or code. The non-transitory storage device 910 can be removed from an interface. The non-transitory storage device 910 embodies one or more non-transitory computer-readable media, which store a program comprising instructions that, when executed by the one or more processors of the computing device 900, cause the computing device 900 to perform the foregoing image depth determining method 200 and variations thereof. The computing device 900 may further comprise a communication device 912. The communication device 912 may be any type of device or system that enables communication with an external device and/or network, and may include, but is not limited to, a modem, a network interface card, an infrared communication device, a wireless communication device and/or a chipset, e.g., a Bluetooth™ device, a 1302.11 device, a Wi-Fi device, a WiMax device, a cellular communication device, and/or the like.

In some embodiments, the computing device 900 may further comprise a working memory 914, which may be any type of memory that stores programs (including instructions) and/or data useful to the working of the processor 904, and may include, but is not limited to, a random access memory and/or a read-only memory.

Software elements (programs) may be located in the working memory 914, and may include, but is not limited to, an operating system 916, one or more application programs 918, drivers, and/or other data and code. The instructions for performing the foregoing methods and steps may be comprised in the one or more application programs 918, and the chip circuit 810 of the foregoing image depth determining apparatus 800 may be implemented by the processor 904 by reading and executing instructions of the one or more application programs 918. Executable code or source code of the instructions of the software elements (programs) may be stored in a non-transitory computer-readable storage medium (e.g., the storage device 910), and may be stored in the working memory 914 (and may be compiled and/or installed) when executed. The executable code or source code of the instructions of the software elements (programs) may also be downloaded from a remote location.

It should further be appreciated that various variations may be made according to specific requirements. For example, tailored hardware may also be used, and/or specific elements may be implemented in hardware, software, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in accordance with the present disclosure.

It should further be understood that the foregoing methods may be implemented in a server-client mode. For example, a client may use a first camera C0 and a second camera C1 to acquire image data and send the image data to a server for subsequent processing. Alternatively, the client may perform a part of processing in the foregoing method, and send data obtained after the processing to the server. The server may receive the data from the client, perform the foregoing method or another part of the foregoing method, and return an execution result to the client. The client may receive the execution result of the method from the server, and may present same to the user, for example, through an output device.

It should further be understood that the components of the computing device 900 can be distributed over a network. For example, some processing may be executed by one processor while other processing may be executed by another processor away from the one processor. Other components of the computing device 900 may also be similarly distributed. As such, the computing device 900 can be understood as a distributed computing system that performs processing at a plurality of processors in a plurality of locations.

The image depth determining method 200 or the image depth determining apparatus 800 described above can be used for various purposes, including facial (typically, human face) recognition. In the context of facial applications, after a facial region is located from a first image IMG0 and a second image IMG1, a facial feature point detection algorithm is used to obtain M facial feature points (for example, feature points at positions such as eyebrows, eyes, nose, mouth, face outline). A facial feature point on the first image IMG0 is denoted as $(x0i, y0i)$, $i=1, \ldots, M$. A facial feature point on the second image IMG1 is denoted as $(x1i, y1i)$, $i=1, \ldots, M$. A matched feature point pair is denoted as $PAIRi ((x0i, y0i), (x1i, y1i))$, $i=1, \ldots, M$. By using the foregoing image depth determining method 200, depth information Di corresponding to each PAIRi can be obtained, where $i=1, \ldots, M$. Then, such depth information can be further used in various specific applications such as living body identification.

Figure 10:
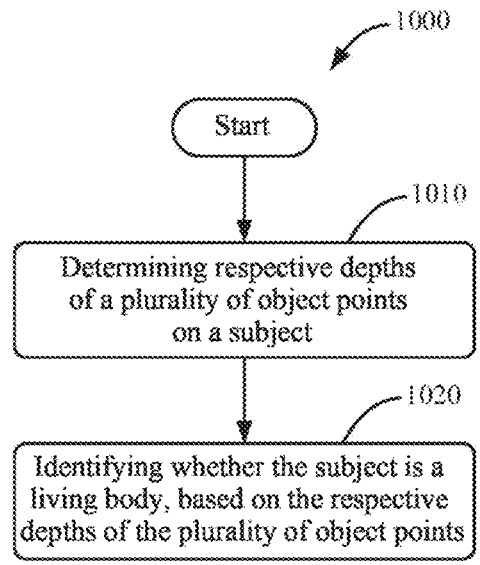
FIG. 10 is a flowchart showing a living body identification method according to an exemplary embodiment of the present disclosure.

FIG. 10 is a flowchart showing a living body identification method 1000 according to an exemplary embodiment of the present disclosure. The living body identification method 1000 may comprise: step 1010, determining, for each of a plurality of feature point pairs associated with a plurality of object points on a subject, respective depths of the plurality of object points by performing the image depth determining method 200 described above or variations thereof, wherein a first pixel of each feature point pair is a facial key-point in the first image, and a second pixel of each feature point pair is a facial key-point in the second image; and step 1020:

identifying whether the subject is a living body, based on the respective depths of the plurality of object points.

Referring to FIG. 10, at step 1010, for each of a plurality of feature point pairs (for example, PAIRi ((x0i, y0i), (x1i, y1i)), i=1, . . . , M) associated with a plurality of object points on a subject, respective depths (for example, Di, i=1, . . . , M) of the plurality of object points are determined by performing the image depth determining method 200 or variations thereof.

Figure 11:
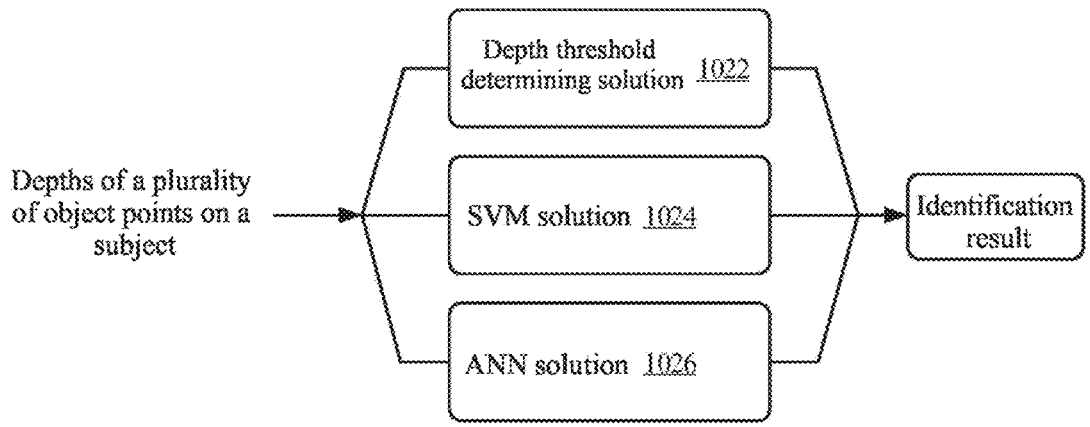
FIG. 11 is a schematic diagram showing an exemplary solution of a step of identifying whether a subject is a living body in the method of FIG. 10 according to an exemplary embodiment of the present disclosure.

At step 1020, it is identified whether the subject is a living body, based on the respective depths Di, i=1, . . . , M of the plurality of object points. Typically, step 1020 may be based on, for example, a facial depth threshold determining solution 1022, a support vector machine (SVM) solution 1024, or an artificial neural network (ANN) solution 1026, as schematically shown at a high level in FIG. 11. The three solutions are described in detail below, but other embodiments are also possible.

In the facial depth threshold determining solution 1022, it is identified whether the subject is a living body, according to a relationship between a function value of depths corresponding to a plurality of object points and a predetermined threshold. Specifically, a function of the depths of the plurality of object points is constructed, and a depth value of each object point is substituted into the function. Then, an obtained function value is compared with the predetermined threshold, and it is identified whether the subject is a living body, based on the comparison result. In some embodiments, this may comprise the following exemplary operations:

(1a) determining a feature point pair with the smallest depth value in feature point pairs, and obtaining a depth value corresponding to the feature point pair;

(1b) subtracting the minimum depth value from each of depth values of the feature point pairs, to obtain relative depth values of the feature point pairs; and (1c) calculating the sum or the sum of squares of the relative depth values of the feature point pairs as a comparison value. When the comparison value is less than the predetermined threshold, the subject is identified as a non-living body; otherwise, the subject is identified as a living body.

In the SVM solution 1024, an input vector is constructed by using depths of object points, and is input to a trained support vector machine, to obtain an identification result. In some embodiments, this may comprise the following exemplary operations: substituting the depth of each object point into the first coordinate representation of the object point, to obtain spatial coordinates of the object point; determining alignment parameters for aligning the respective spatial coordinates of the plurality of object points with the respective key-point spatial coordinates of the standard face; aligning, by using the determined alignment parameters, the respective spatial coordinates with the respective key-point spatial coordinates of the standard face, to obtain corresponding aligned spatial coordinates; constructing a depth feature vector by using depth components of the corresponding aligned spatial coordinates; and inputting the depth feature vector to a trained support vector machine classifier, to obtain an identification result.

The operations in the SVM solution 1024 are described in detail below.

(2a) The depth of each object point is substituted into a first coordinate representation PC0 (PC0x, PC0y, PC0z) of the object point, to obtain spatial coordinates of the object point. It can be learned from the above description of the image depth determining method 200 that the first coordinate representation PC0 (PC0x, PC0y, PC0z) can be considered as a function of a depth value, where PC0z is considered to be equal to the depth value, and both PC0x and PC0y can be represented by PC0z through equation (eq1). Therefore, for M feature point pairs, the respective M depth values are substituted into the first coordinate representation PC0 (PC0x, PC0y, PC0z), so that M spatial coordinates $\{(x_i, y_i, z_i), i=1, \ldots, M\}$ can be obtained.

(2b) Alignment parameters for aligning the respective spatial coordinates $\{(x_i, y_i, z_i), i=1, \ldots, M\}$ of the plurality of object points with the respective key-point spatial coordinates of the standard face are determined. The purpose of alignment is to map a face at any angle to the shape of a front face. The standard face can be obtained by averaging spatial coordinates of a set of key-points that are obtained by capturing a plurality of front faces. The key-point spatial coordinates of the standard face are denoted as $\{(xs_i, ys_i, zs_i), i=1, \ldots, M\}$. The alignment parameters comprise a rotation vector Ra, a translation vector Ta, and a scaling scale s. Then, there is $$\begin{bmatrix} x'_i \\ y'_i \\ z'_i \end{bmatrix} = \begin{bmatrix} sRa & Ta \\ 0 & 1 \end{bmatrix} \begin{bmatrix} x_i \\ y_i \\ z_i \end{bmatrix}.$$

The alignment parameters Ra, Ta, and s can be obtained by solving the minimized energy function argmin $$\sum_{i=1}^{M} \|(x'_i, y'_i, z'_i) - (xs_i, ys_i, zs_i)\|_2^2.$$

(2c) By using the determined alignment parameters, the respective spatial coordinates $\{(x_i, y_i, z_i), i=1, \ldots, M\}$ are aligned with the respective key-point spatial coordinates $\{(xs_i, ys_i, zs_i), i=1, \ldots, M\}$ of the standard face, to obtain corresponding aligned spatial coordinates. Specifically, by using the alignment parameters, the aligned key-point spatial coordinates $\{(x'_i, y'_i, z'_i), i=1, \ldots, M\}$ can be obtained.

(2d) A depth feature vector is constructed by using depth components of the corresponding aligned spatial coordinates $\{(x'_i, y'_i, z'_i), i=1, \ldots, M\}$. In an example, an M-dimensional depth feature vector $FEATURE_i=\{z'_i, i=1, \ldots, M\}$ can be constructed.

(2e) The depth feature vector $FEATURE_i=\{z'_i, i=1, \ldots, M\}$ is input to a trained support vector machine classifier, to obtain an identification result. The SVM classifier has been trained in advance. In the training of the SVM classifier, alignment of key-point spatial coordinates of living body samples and non-living body samples are performed in the above-mentioned manner, and depth feature vectors are constructed as training samples. Then, the training samples are used to train the SVM classifier, to obtain SVM classifier parameters.

In some embodiments, on the basis of the identification result of the SVM solution 1024, the scaling scale s may be further used for living body identification. The size of the scaling scale s represents a proportional relationship between the sizes of a detected face and the standard face. With a large amount of facial data, a predetermined range of the scaling scale s can be obtained (for example, using a statistical method), and used as an indicator indicating whether the detected face is a normal face. In the case that the identification result of the SVM indicates that the subject is a living body, if the scaling scale s is within the predetermined range, the subject is identified as a living body. If the scaling scale s is not within the predetermined range (for example, lower than the lower limit of the predetermined range or higher than the upper limit of the predetermined range), the subject is identified as a non-living body.

In some embodiments, as an alternative to the SVM solution 1024, the alignment parameters (which comprises the scaling scale s) determined in the above operations (2a) and (2b) can be directly used for living body identification. To be specific, if the scaling scale s is within the predetermined range, the subject is identified as a living body. If the scaling scale s is not within the predetermined range (for example, lower than the lower limit of the predetermined range or higher than the upper limit of the predetermined range), the subject is identified as a non-living body.

In the ANN solution 1026, an input vector is constructed by using spatial coordinates $\{(x'_i, y'_i, z'_i), i=1, \ldots, M\}$ of object points, and is input to a trained support vector machine, to obtain an identification result. In some embodiments, this may comprise the following exemplary operations: substituting the depth of each object point into the first coordinate representation of the object point, to obtain spatial coordinates of the object point; determining alignment parameters for aligning the respective spatial coordinates of the plurality of object points with the respective key-point spatial coordinates of the standard face; aligning, by using the determined alignment parameters, the respective spatial coordinates with the respective key-point spatial coordinates of the standard face, to obtain corresponding aligned spatial coordinates; constructing an input vector by using the corresponding aligned spatial coordinates; and inputting the input vector to a trained artificial neural network, to obtain an identification result.

The operations in the ANN solution 1026 are described in detail below.

(3a) For M feature point pairs, the respective M depth values are substituted into the first coordinate representation PC0 (PC0x, PC0y, PC0z), to obtain M spatial coordinates $\{(x_i, y_i, z_i), i=1, \ldots, M\}$.

(3b) Alignment parameters for aligning the respective spatial coordinates $\{(x_i, y_i, z_i), i=1, \ldots, M\}$ of the plurality of object points with the respective key-point spatial coordinates of the standard face are determined.

(3c) By using the determined alignment parameters, the respective spatial coordinates $\{(x_i, y_i, z_i), i=1, \ldots, M\}$ are aligned with the respective key-point spatial coordinates of the standard face, to obtain corresponding aligned spatial coordinates. Here, the operations (3a) to (3c) are the same as the operations (2a) to (2c) described above with respect to the SVM solution 1024, and details are not described here again.

(3d) An input vector is constructed by using the corresponding aligned spatial coordinates $\{(x'_i, y'_i, z'_i), i=1, \ldots, M\}$. In an example, $\{(x'_i, y'_i, z'_i), i=1, \ldots, M\}$ may be directly constructed as an input vector.

(3e) The input vector is input to a trained ANN, to obtain an identification result. Similar to the SVM solution 1024, the ANN has been trained in advance. In the training of the ANN, alignment of key-point spatial coordinates of living samples and non-living samples are performed in the above-mentioned manner, and training samples are constructed. Then, the training samples are used to train the ANN, to obtain network parameters of the ANN. In this embodiment, any suitable type of artificial neural network can be used, and the subject matter claimed in the present disclosure is not limited in these aspects.

In some embodiments, on the basis of the identification result of the ANN solution 1026, the scaling scale s may be further used for living body identification. To be specific, if the identification result of the ANN indicates that the subject is a living body, the scaling scale s is used for further identification. If the scaling scale s is within a predetermined range, the subject is identified as a living body. If the scaling scale s is not within the predetermined range (for example, lower than the lower limit of the predetermined range or higher than the upper limit of the predetermined range), the subject is identified as a non-living body.

Although the embodiments or examples of the present disclosure have been described with reference to the drawings, it should be understood that the methods, systems and devices described above are merely exemplary embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An image depth determining method, comprising:
  obtaining pixel coordinates of a feature point pair associated with an object point on a subject, wherein the feature point pair comprises a first pixel in a first image corresponding to the object point and a second pixel in a second image corresponding to the object point, wherein the first image is an image captured by a first camera for the subject, and the second image is an image captured by a second camera for the subject, and wherein the pixel coordinates comprise first pixel coordinates of the first pixel in the first image and second pixel coordinates of the second pixel in the second image;
  determining a first straight line passing through the origin of a first camera coordinate system of the first camera based on the first pixel coordinates and intrinsic parameters of the first camera, wherein a first coordinate representation of the object point in the first camera coordinate system is located on the first straight line;
  determining a second straight line passing through the origin of a second camera coordinate system of the second camera based on the second pixel coordinates and intrinsic parameters of the second camera, wherein a second coordinate representation of the object point in the second camera coordinate system is located on the second straight line; and
  determining the depth of the object point based on the first straight line, the second straight line, and extrinsic parameters describing a relative position relationship between the first camera and the second camera.

2. The method of claim 1, wherein the determining the depth of the object point based on the first straight line, the second straight line, and extrinsic parameters describing a relative position relationship between the first camera and the second camera comprises:
  determining a representation of the second straight line in the first camera coordinate system based on the second straight line and the extrinsic parameters; and determining, in the first camera coordinate system, the depth of the object point based on the first straight line and the second straight line.

3. The method of claim 2, wherein the determining a representation of the second straight line in the first camera coordinate system based on the second straight line and the extrinsic parameters comprises:
converting, by using the extrinsic parameters, the second coordinate representation to a third coordinate representation in the first camera coordinate system, and determining a fourth coordinate representation of the origin of the second camera coordinate system in the first camera coordinate system; and
determining the representation of the second straight line in the first camera coordinate system based on the third coordinate representation and the fourth coordinate representation.

4. The method of claim 2, wherein the determining, in the first camera coordinate system, the depth of the object point based on the first straight line and the second straight line comprises:
determining a common perpendicular of the first straight line and the second straight line in response to the first straight line and the second straight line being non-coplanar;
determining coordinates of a first intersection point of the first straight line and the common perpendicular and coordinates of a second intersection point of the second straight line and the common perpendicular; and
determining the depth of the object point based on a first depth component of the coordinates of the first intersection point and a second depth component of the coordinates of the second intersection point.

5. The method of claim 4, wherein the determining coordinates of a first intersection point of the first straight line and the common perpendicular and coordinates of a second intersection point of the second straight line and the common perpendicular comprises:
determining the coordinates of the first intersection point and the coordinates of the second intersection point according to the following spatial relationships:
a direction vector of the first straight line is parallel to a direction vector pointing from the first intersection point to the origin of the first camera coordinate system;
a direction vector of the second straight line is parallel to a direction vector pointing from the second intersection point to the origin of the second camera coordinate system; and
a direction vector of the common perpendicular is parallel to a direction vector pointing from the second intersection point to the first intersection point.

6. The method of claim 4, wherein the determining the depth of the object point based on a first depth component of the coordinates of the first intersection point and a second depth component of the coordinates of the second intersection point comprises:
determining a predefined function value of the first depth component and the second depth component as the depth of the object point.

7. The method of claim 6, wherein the predefined function value comprises a weighted average.

8. The method of claim 7, wherein the weighted average comprises an arithmetic average.

9. The method of claim 2, wherein the determining, in the first camera coordinate system, the depth of the object point based on the first straight line and the second straight line comprises:
determining a depth component of coordinates of an intersection point of the first straight line and the second straight line as the depth of the object point, in response to the first straight line and the second straight line being coplanar.

10. The method of claim 1, wherein the first camera and the second camera are cameras of different models.

11. The method of claim 1, further comprising:
performing undistortion on the first pixel coordinates before the determining a first straight line passing through the origin of a first camera coordinate system of the first camera based on the first pixel coordinates and intrinsic parameters of the first camera; and performing undistortion on the second pixel coordinates before the determining a second straight line passing through the origin of a second camera coordinate system of the second camera based on the second pixel coordinates and intrinsic parameters of the second camera.

12. A chip circuit, comprising:
circuit units configured to perform operations comprising:
obtaining pixel coordinates of a feature point pair associated with an object point on a subject, wherein the feature point pair comprises a first pixel in a first image corresponding to the object point and a second pixel in a second image corresponding to the object point, wherein the first image is an image captured by a first camera for the subject, and the second image is an image captured by a second camera for the subject, and wherein the pixel coordinates comprise first pixel coordinates of the first pixel in the first image and second pixel coordinates of the second pixel in the second image;
determining a first straight line passing through the origin of a first camera coordinate system of the first camera based on the first pixel coordinates and intrinsic parameters of the first camera, wherein a first coordinate representation of the object point in the first camera coordinate system is located on the first straight line;
determining a second straight line passing through the origin of a second camera coordinate system of the second camera based on the second pixel coordinates and intrinsic parameters of the second camera, wherein a second coordinate representation of the object point in the second camera coordinate system is located on the second straight line; and
determining the depth of the object point based on the first straight line, the second straight line, and extrinsic parameters describing a relative position relationship between the first camera and the second camera.

13. A computing device, comprising:
one or more processors; and
a memory, which stores a program comprising instructions that, when executed by the one or more processors, cause the one or more processors to perform operations comprising:
obtaining pixel coordinates of a feature point pair associated with an object point on a subject, wherein the feature point pair comprises a first pixel in a first image corresponding to the object point and a second pixel in a second image corresponding to the object point, wherein the first image is an image captured by a first camera for the subject, and the second image is an image captured by a second camera for the subject, and wherein the pixel coordinates comprise first pixel coordinates of the first pixel in the first image and second pixel coordinates of the second pixel in the second image;

determining a first straight line passing through the origin of a first camera coordinate system of the first camera based on the first pixel coordinates and intrinsic parameters of the first camera, wherein a first coordinate representation of the object point in the first camera coordinate system is located on the first straight line;

determining a second straight line passing through the origin of a second camera coordinate system of the second camera based on the second pixel coordinates and intrinsic parameters of the second camera, wherein a second coordinate representation of the object point in the second camera coordinate system is located on the second straight line; and determining the depth of the object point based on the first straight line, the second straight line, and extrinsic parameters describing a relative position relationship between the first camera and the second camera.

14. A living body identification method, comprising:

determining, for each of a plurality of feature point pairs associated with a plurality of object points on a subject, respective depths of the plurality of object points by performing the image depth determining method according to claim 1, wherein a first pixel of each feature point pair is a facial key-point in the first image, and a second pixel of each feature point pair is a facial key-point in the second image; and identifying whether the subject is a living body, based on the respective depths of the plurality of object points.

15. The living body identification method of claim 14, wherein the identifying whether the subject is a living body, based on the respective depths of the plurality of object points comprises: identifying whether the subject is a living body, according to a relationship between a function value of the respective depths of the plurality of object points and a predetermined threshold.

16. The living body identification method of claim 14, wherein coordinate components of the first coordinate representation of each object point are a function of the depth of the object point, and the identifying whether the subject is a living body, based on the respective depths of the plurality of object points comprises:

substituting the depth of each object point into the first coordinate representation of the object point, to obtain spatial coordinates of the object point;

determining alignment parameters for aligning the respective spatial coordinates of the plurality of object points with the respective key-point spatial coordinates of the standard face;

aligning, by using the determined alignment parameters, the respective spatial coordinates with the respective key-point spatial coordinates of the standard face, to obtain corresponding aligned spatial coordinates;

constructing a depth feature vector by using depth components of the corresponding aligned spatial coordinates; and inputting the depth feature vector to a trained support vector machine classifier, to obtain an identification result.

17. The living body identification method of claim 16, wherein the alignment parameters comprise a scaling scale, and wherein the living body identification method further comprises:

determining, in response to the identification result indicating that the subject is a living body, whether the scaling scale falls within a predetermined range;

identifying the subject as a living body in response to determining that the scaling scale is within the predetermined range; and identifying the subject as a non-living body in response to determining that the scaling scale is not within the predetermined range.

18. The living body identification method of claim 14, wherein coordinate components of the first coordinate representation of each object point are a function of the depth of the object point, and the identifying whether the subject is a living body, based on the respective depths of the plurality of object points comprises:

substituting the depth of each object point into the first coordinate representation of the object point, to obtain spatial coordinates of the object point;

determining alignment parameters for aligning the respective spatial coordinates of the plurality of object points with the respective key-point spatial coordinates of the standard face, wherein the alignment parameters comprise a scaling scale;

identifying the subject as a living body in response to the scaling scale being within the predetermined range; and identifying the subject as a non-living body in response to the scaling scale being not within the predetermined range.

19. The living body identification method of claim 14, wherein coordinate components of the first coordinate representation of each object point are a function of the depth of the object point, and the identifying whether the subject is a living body, based on the respective depths of the plurality of object points comprises:

substituting the depth of each object point into the first coordinate representation of the object point, to obtain spatial coordinates of the object point;

determining alignment parameters for aligning the respective spatial coordinates of the plurality of object points with the respective key-point spatial coordinates of the standard face;

aligning, by using the determined alignment parameters, the respective spatial coordinates with the respective key-point spatial coordinates of the standard face, to obtain corresponding aligned spatial coordinates;

constructing an input vector by using the corresponding aligned spatial coordinates; and inputting the input vector to a trained artificial neural network, to obtain an identification result.

20. The living body identification method of claim 19, wherein the alignment parameters comprise a scaling scale, and wherein the living body identification method further comprises:

determining, in response to the identification result indicating that the subject is a living body, whether the scaling scale is within a predetermined range;

identifying the subject as a living body in response to determining that the scaling scale is within the predetermined range; and identifying the subject as a non-living body in response to determining that the scaling scale is not within the predetermined range.

* * * * *